(12) United States Patent
Cheng et al.

(10) Patent No.: US 10,230,891 B2
(45) Date of Patent: Mar. 12, 2019

(54) METHOD, DEVICE AND MEDIUM OF PHOTOGRAPHY PROMPTS

(71) Applicant: BEIJING XIAOMI MOBILE SOFTWARE CO., LTD., Beijing (CN)

(72) Inventors: Yue Cheng, Beijing (CN); Yan Xie, Beijing (CN); Qiqi Cui, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/364,278

(22) Filed: Nov. 30, 2016

(65) Prior Publication Data
US 2017/0366745 A1 Dec. 21, 2017

(30) Foreign Application Priority Data
Jun. 15, 2016 (CN) .......................... 2016 1 0425571

(51) Int. Cl.
*H04N 5/232* (2006.01)
*G06F 3/16* (2006.01)
*G10L 13/02* (2013.01)
*G06K 9/00* (2006.01)

(52) U.S. Cl.
CPC ......... *H04N 5/23222* (2013.01); *G06F 3/167* (2013.01); *G06K 9/00221* (2013.01); *G06K 9/00912* (2013.01); *G10L 13/02* (2013.01); *H04N 5/23219* (2013.01); *H04N 5/23293* (2013.01); *G06K 2009/00322* (2013.01)

(58) Field of Classification Search
None
See application file for complete search history.

(56) References Cited

U.S. PATENT DOCUMENTS

| | | |
|---|---|---|
| 2009/0273667 A1 | 11/2009 | Nozaki et al. |
| 2011/0134269 A1 | 6/2011 | Kim |
| 2012/0050601 A1 | 3/2012 | Lee |
| 2012/0327258 A1 | 12/2012 | Holland |
| 2013/0201359 A1 | 8/2013 | Wu |
| 2014/0009663 A1 | 1/2014 | Chen |

FOREIGN PATENT DOCUMENTS

| | | |
|---|---|---|
| CN | 101415074 A | 4/2009 |
| CN | 101600051 A | 12/2009 |
| CN | 103391361 A | 11/2013 |
| CN | 105282360 A | 1/2016 |
| CN | 105554365 A | 5/2016 |
| EP | 2753064 A1 | 7/2014 |
| WO | 2015115203 A1 | 8/2015 |

OTHER PUBLICATIONS

Office action from EPO for EP application 16201337.
ISR and written opinions of PCT application CN2016098335.

*Primary Examiner* — Mark T Monk
(74) *Attorney, Agent, or Firm* — Jun He Law Offices P.C.; James J. Zhu

(57) ABSTRACT

A method, device and medium of photography prompts are provided. The method includes: obtaining a target state characteristic of a target subject in a current viewfinder interface of a terminal; and determining a target voice prompt message corresponding to the target state characteristic.

12 Claims, 7 Drawing Sheets determining the preset age range to which the age of each target subject belongs if there are a plurality of target subjects — S401 selecting one of at least one preset age ranges as the target age range according to a predetermined rule — S402

METHOD, DEVICE AND MEDIUM OF PHOTOGRAPHY PROMPTS

CROSS-REFERENCE TO RELATED APPLICATIONS

This application is based on and claims priority to Chinese Patent Application No. 201610425571.9, filed on Jun. 15, 2016, the entire contents of which are incorporated herein by reference.

FIELD

The present disclosure relates to the field of photographing technology, and more particularly, to a method, device and medium of photography prompts.

BACKGROUND

With the popularity of intelligent terminals with photographing and shooting functions, people can take pictures and videos anytime and anywhere. Current intelligent terminals may emit a prompt tone after a user presses a camera button, so as to remind the user that the photographing or shooting is underway.

SUMMARY

According to a first aspect of embodiments of the present disclosure, there is provided a method of photography prompts. The method includes: obtaining a target state characteristic of a target subject in a current viewfinder interface of a terminal; and determining a target voice prompt message corresponding to the target state characteristic.

According to a second aspect of embodiments of the present disclosure, there is provided a device of photography prompts. The device includes: a processor, and a memory configured to store an instruction executable by the processor, in which the processor is configured to: obtain a target state characteristic of a target subject in a current viewfinder interface of a terminal, and determine a target voice prompt message corresponding to the target state characteristic.

According to a third aspect of embodiments of the present disclosure, a non-transitory computer-readable storage medium is provided. The non-transitory computer-readable storage medium has stored therein instructions that, when executed by a processor of a device, causes the device to perform a method of photography prompts. The method includes: obtaining a target state characteristic of a target subject in a current viewfinder interface of a terminal; and determining a target voice prompt message corresponding to the target state characteristic.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Embodiments of the present disclosure provide a method of photography prompts, which may be applied to a photographing device or other terminal devices for photographing, such as a smart camera and a mobile terminal.

Figure 1:
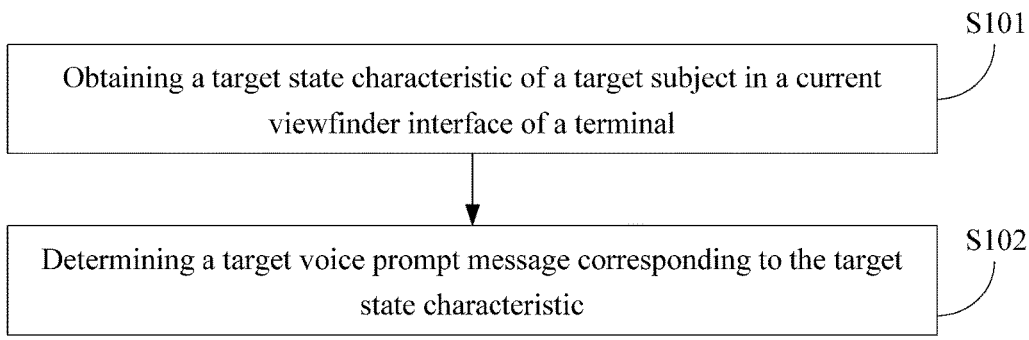
FIG. 1 is a flow chart of a method of photography prompts according to an exemplary embodiment.

FIG. 1 is a flow chart of a method of photography prompts according to an exemplary embodiment.

As shown in FIG. 1, the method includes block S101 to block S102.

In block S101, a target state characteristic of a target subject in a current viewfinder interface of a terminal is obtained.

When photographing with the photographing device such as the terminal, the target subject in the current viewfinder interface is obtained. For example, if the current viewfinder interface contains scenes and a person A, the person A may be determined as target subject. After the target subject is determined, the target state characteristic of the target subject is obtained, in which the target state characteristic includes at least one of an age of the target subject and completeness of imaging in the current viewfinder interface (i.e. if the whole person as the target subject is completely in the current viewfinder interface).

In block S102, a target voice prompt message corresponding to the target state characteristic is determined.

In this embodiment, the target state characteristic of the target subject in the current viewfinder interface of the terminal is obtained, and the target voice prompt message corresponding to the target state characteristic is determined thereby. Different target subjects and target state characteristics may correspond to different target voice prompt messages, instead of prompting all the users with the same prompt message. Thus, different prompting needs of different users can be satisfied through targeted output of the target voice prompt message.

Figure 2:
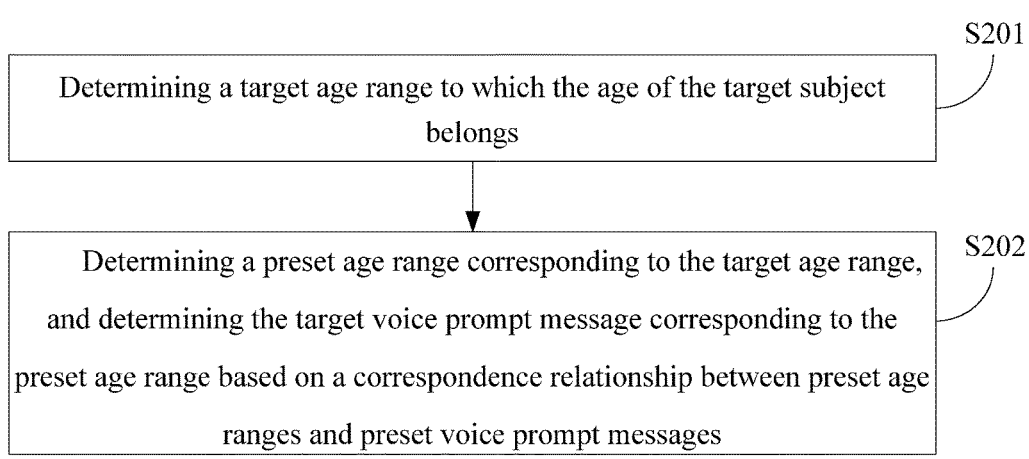
FIG. 2 is a flow chart of block S102 in a method of photography prompts according to an exemplary embodiment.

FIG. 2 is a flow chart of block S102 in a method of photography prompts according to an exemplary embodiment.

As shown in FIG. 2, in an embodiment, when the target state characteristic includes an age of the target subject, block S102 includes block S201 to block S202.

In block S201, a target age range to which the age of the target subject belongs is determined.

A plurality of age ranges may be preset, for example, an age range from 1 year old to 6 years old is set as children, an age range from 7 years old to 17 years old is set as teenagers, an age range from 18 years old to 50 years old is set as adults, and an age range of over 50 years old is set as the elderly. Thus, regarding different target subjects, the target age range to which the age of the target subject belongs is determined first. For example, if the person A is obtained as the target subject in the current viewfinder interface, an age of the person A is further obtained, which may be realized in many ways. For example, facial recognition and analysis concerning the person A may be conducted, and the age of the person A is found out according to a facial feature (like skin conditions) of the user. Certainly, a prompt message may be output to prompt the user to input his own age, and the age of the user may be obtained from other applications—for example, the age of the person may be obtained from a contact list of the terminal if the contact list is stored with head portraits and profiles of users.

Supposing that the person A obtained as the target subject in the current viewfinder interface is three years old, the target age range to which the person A belongs is the age range from 1 year old to 6 years old as children.

In block S202, a preset age range corresponding to the target age range is determined and the target voice prompt message corresponding to the preset age range is determined based on a correspondence relationship between preset age ranges and preset voice prompt messages.

The terminal may pre-store respective voice prompt messages corresponding to respective age ranges. For example, for children of 1 to 6 years old, the preset voice prompt message may be nursery rhymes, sounds of parents, sounds of kitten and puppy and sounds of object collisions, so as to attract attention of children. For teenagers of 7 to 17 years old, the preset voice prompt message may be cartoon songs, audios dubbed for different characters in cartoons, and classic TV theme songs. For adults of 18 to 50 years old, the preset voice prompt message may be classic music appropriate for this age range. For the elderly of over 50 years old, the preset voice prompt message may be a prompt tone of a large volume, such that an elder user weak in listening may listen to the prompt tone clearly.

Certainly, one age range may be further subdivided. For example, the age range from 1 year old to 6 years old may be subdivided into an age range of 1 to 3 years old and an age range of 4 to 6 years old; for the children of 1 to 3 years old, the preset voice prompt message may be simple audios, while for the children of 4 to 6 years old, the preset voice prompt message may be lively songs which enable children to dance to the music to shoot videos.

In this embodiment, after the target age range to which the age of the target subject belongs is determined, the target voice prompt message may be determined based on the target age range and the correspondence relationship between preset age ranges and preset voice prompt messages. Thus, different prompting needs of different users can be satisfied through the targeted output of the target voice prompt message, instead of prompting all the users with the same prompt message.

Besides the age of the target subject, the target state characteristic may be other characteristics, for example, completeness of the target subject in the current viewfinder interface.

Figure 3A:
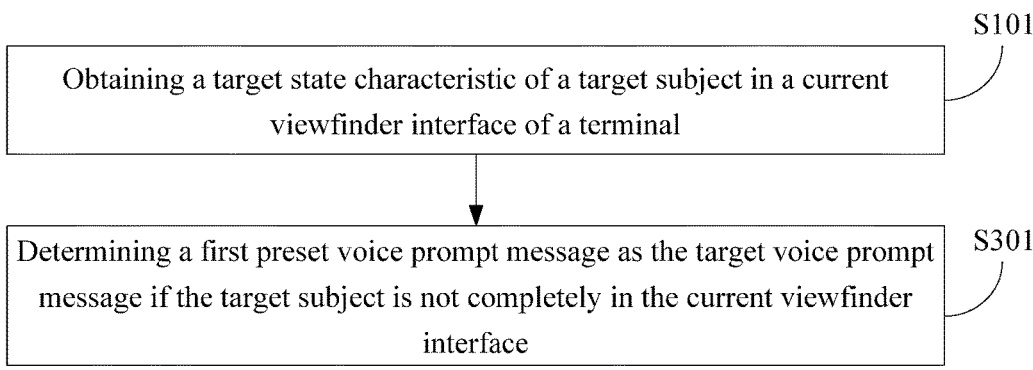
FIG. 3A is a flow chart of another method of photography prompts according to an exemplary embodiment.

FIG. 3A is a flow chart of another method of photography prompts according to an exemplary embodiment.

As shown in FIG. 3A, in an embodiment, when the target state characteristic includes completeness in the current viewfinder interface, block S102 may include block S301.

In block S301, a first preset voice prompt message is determined as the target voice prompt message if the target subject is not completely in the current viewfinder interface.

If the target subject in the current viewfinder interface is not complete, for example, only half of the body of the user being in the current viewfinder interface, the first preset voice prompt message is determined as the target voice prompt message. The first preset voice prompt message may be a prompt message for prompting the user to adjust his position, like "please adjust your position and enter the viewfinder interface."

Figure 3B:
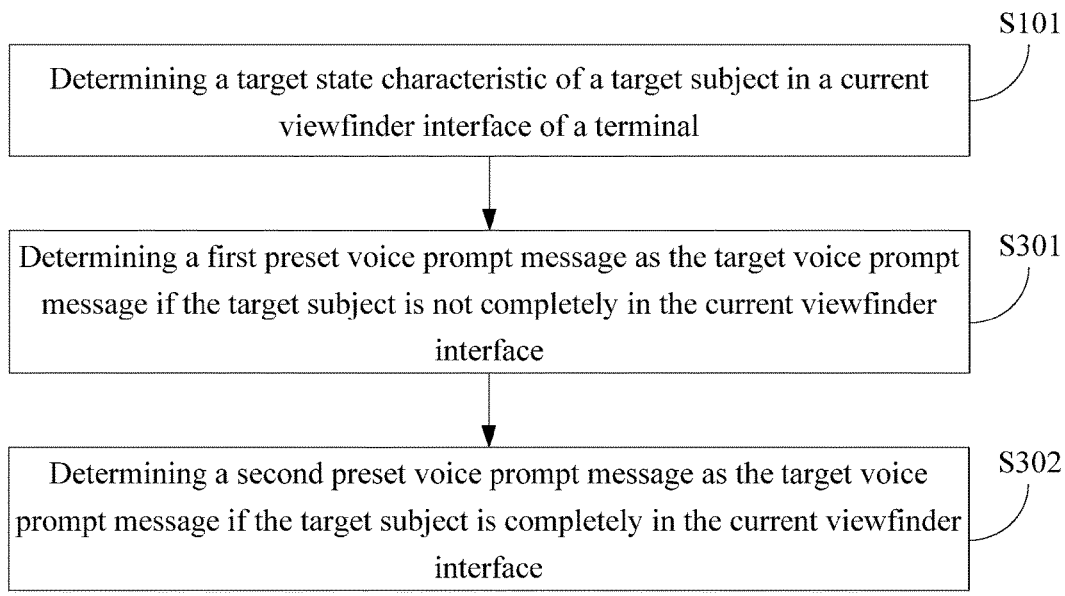
FIG. 3B is a flow chart of another method of photography prompts according to an exemplary embodiment.

FIG. 3B is a flow chart of another method of photography prompts according to an exemplary embodiment.

Further, as shown in FIG. 3B, block S302 is further included in this embodiment, i.e. determining a second preset voice prompt message as the target voice prompt message if the target subject is completely in the current viewfinder interface.

When the target subject is completely in the current viewfinder interface, for example, the whole body of the user being in the center of the current viewfinder interface, the second preset voice prompt message is determined as the target voice prompt message. The second preset voice prompt message may be a prompt message, like "the current position is very good and please shoot."

Thus, if the user does not fully enter the current viewfinder interface, the user may be prompted to avoid a defect of incomplete portraits in a photo taken by the user, thereby ensuring the quality of the photo taken by the user and improving user experience.

Figure 4:
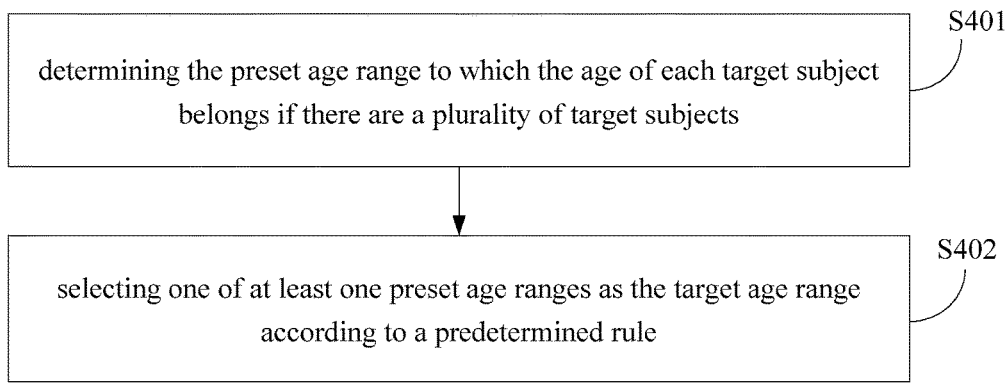
FIG. 4 is a flow chart of block S102 in another method of photography prompts according to an exemplary embodiment.

FIG. 4 is a flow chart of block S102 in another method of photography prompts according to an exemplary embodiment.

As shown in FIG. 4, in an embodiment, block S102 may further include block S401 to block S402.

In block S401, if there are a plurality of target subjects, the preset age range to which the age of each target subject belongs is determined.

When there are a plurality of target subjects, for example, shooting many people at the same time, the preset age range to which the age of each target subject belongs may be determined. For example, the target subjects include persons A, B and C, the person A is 30 years old, whose target age range is the age range of 18 to 50 years old as adults, the person B is 3 years old, whose target age range is the age range of 1 to 6 years old as children, and the person C is 35 years old, whose target age range is the age range of 18 to 50 years old as adults. In such a case, a plurality of target age ranges are presented, and it is possible to select a final target age range according to a predetermined rule.

In block S402, one of at least one preset age ranges is selected as the target age range according to the predetermined rule. The predetermined rule may include counting the number of times of each preset age range to which each target subject belongs and selecting the preset age range with the maximum number of times as the target age range.

In the above example where the target subjects include persons A, B and C, it is obtained that the person A is 30 years old, whose target age range is the age range of 18 to 50 years old as adults, the person B is 3 years old, whose target age range is the age range of 1 to 6 years old as children, and the person C is 35 years old, whose target age range is the age range of 18 to 50 years old as adults. Thus, the age range of 18 to 50 years old as adults appears twice while the age range of 1 to 6 years old as children appears once. In such a case, the age range of 18 to 50 years old as adults is determined as the target age range, and the voice prompt message corresponding to the age range of 18 to 50 years old is determined as the target voice prompt message. This approach will meet the prompting needs of most of the target persons, and improve user experience of most photographed subjects.

Alternatively, the predetermined rule may include: selecting the preset age range of highest priority as the target age range from the preset age ranges of respective target subjects based on priorities of the preset age ranges.

In this embodiment, the user or manufacturer may preset the priority of age ranges, for example, setting a descending order of priority: children, the elderly, teenagers and adults. In a case of a plurality of target subjects, the preset age range with the highest priority is selected as the target age range.

In the same example where the target subjects include persons A, B and C, it is obtained that the person A is 30 years old, whose target age range is the age range of 18 to 50 years old as adults, the person B is 3 years old, whose target age range is the age range of 1 to 6 years old as children, and the person C is 35 years old, whose target age range is the age range of 18 to 50 years old as adults, so the age range of 1 to 6 years old as children is determined as the target age range according to the order of priority, and the voice prompt message corresponding to the age range of 1 to 6 years old is determined as the target voice prompt message. This approach will meet the prompting needs of specific target persons, and improve user experience of specific photographed subjects.

Figure 5A:
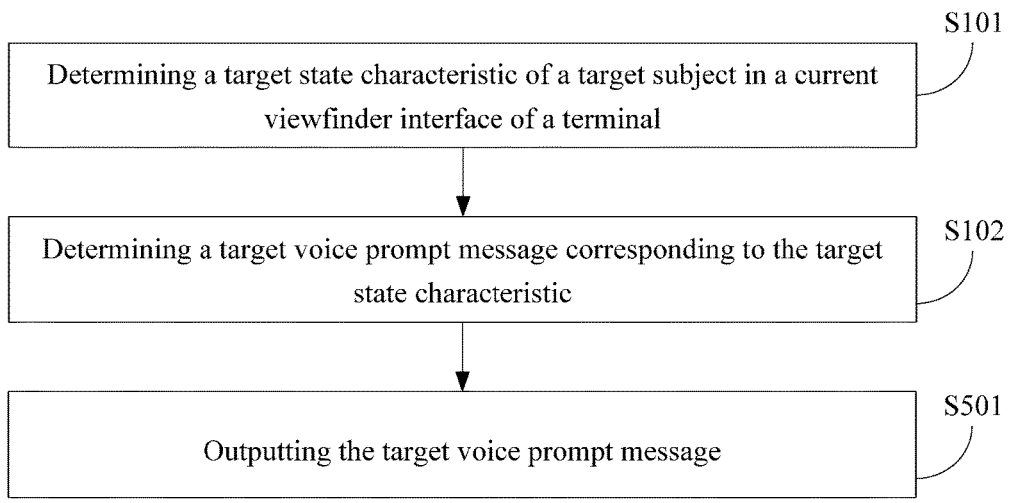
FIG. 5A is a flow chart of another method of photography prompts according to an exemplary embodiment.

FIG. 5A is a flow chart of another method of photography prompts according to an exemplary embodiment.

As shown in FIG. 5A, in an embodiment, the method further includes block S501.

In block S501, the target voice prompt message is output.

The target voice prompt message may be output after being determined, for example, through voice broadcast, such that the user acquires the prompt message.

Figure 5B:
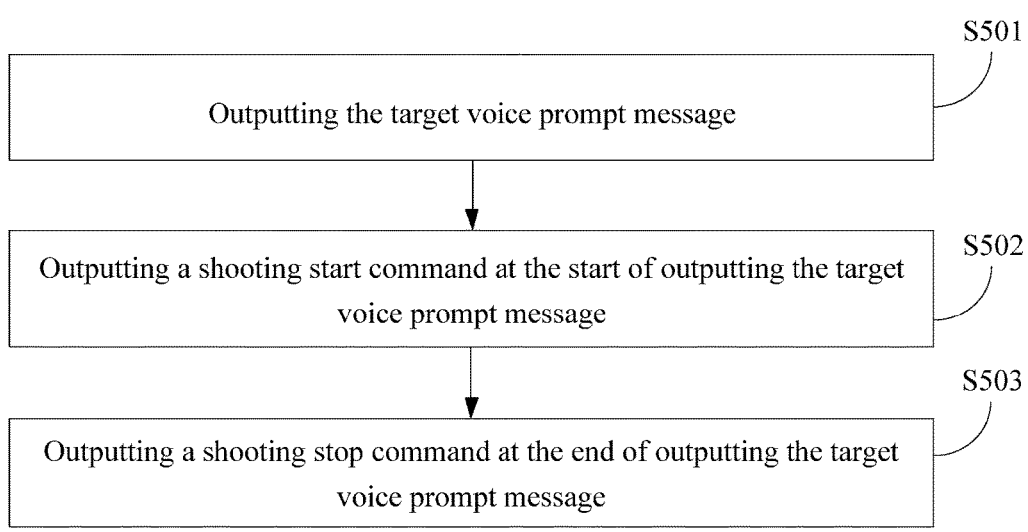
FIG. 5B is a flow chart of another method of photography prompts according to an exemplary embodiment.

FIG. 5B is a flow chart of another method of photography prompts according to an exemplary embodiment.

Further, as shown in FIG. 5B, in this embodiment, block S502 to block S503 are further included.

In block S502, a shooting start command is output at the start of outputting the target voice prompt message.

In this embodiment, the shooting start command may be output at the start of outputting the target voice prompt message, so as to control the terminal to start shooting. For example, the terminal starts automatic snapshot, continuous capture or video recording at the start of outputting the target voice prompt message.

In block S503, a shooting stop command may be output at the end of outputting the target voice prompt message.

The terminal starts automatic snapshot, continuous capture or video recording at the start of outputting the target voice prompt message. However, the shooting stop command may be output at the end of outputting the target voice prompt message, so as to stop automatic snapshot, continuous capture or video recording.

Figure 6:
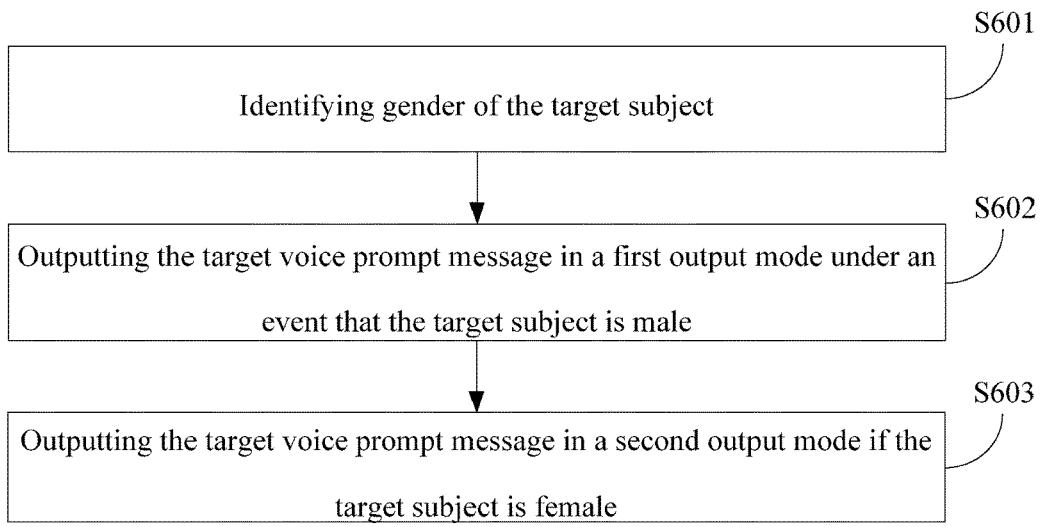
FIG. 6 is a flow chart of block S501 in another method of photography prompts according to an exemplary embodiment.

FIG. 6 is a flow chart of block S501 in another method of photography prompts according to an exemplary embodiment.

As shown in FIG. 6, in an embodiment, block S501 may include block S601 to block S603.

In block S601, gender of the target subject is identified.

In block S602, the target voice prompt message is output in a first output mode if the target subject is male.

In block S603, the target voice prompt message is output in a second output mode if the target subject is female.

In this embodiment, the target voice prompt message may be output in different modes according to the gender of the target subject. For example, when the target subject is male, the target voice prompt message may be output in a gentle female voice. When the target subject is female, the target voice prompt message may be output in a magnetic male voice, so as to further improve the user experience.

Apparatus embodiments of the present disclosure will be described below and used to execute the method embodiments of the present disclosure.

Figure 7:
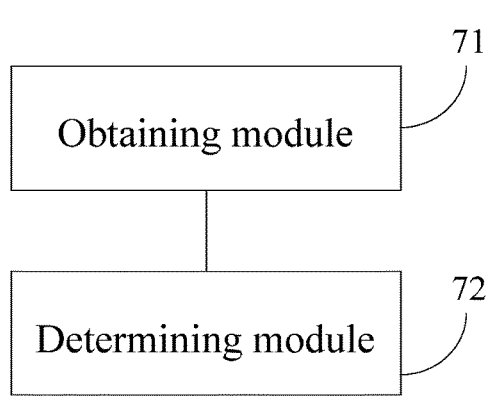
FIG. 7 is a block diagram of an apparatus of photography prompts according to an exemplary embodiment.

FIG. 7 is a block diagram of an apparatus of photography prompts according to an exemplary embodiment. The apparatus may be realized as a part of the photographing device or as the photographing device per se via a piece of software, a piece of hardware or the combination of the both.

As shown in FIG. 7, the apparatus includes: an obtaining module 71 configured to obtain a target state characteristic of a target subject in a current viewfinder interface of a terminal; and a determining module 72 configured to determine a target voice prompt message corresponding to the target state characteristic obtained by the obtaining module 71.

In this embodiment, the target state characteristic of the target subject in the current viewfinder interface of the terminal is obtained, and the target voice prompt message corresponding to the target state characteristic is determined. Thereby, Different target subjects and target state characteristics may correspond to different target voice prompt messages, instead of prompting all the users with the same prompt message. Thus, different prompting needs of different users can be satisfied through targeted output of the target voice prompt message.

Figure 8:
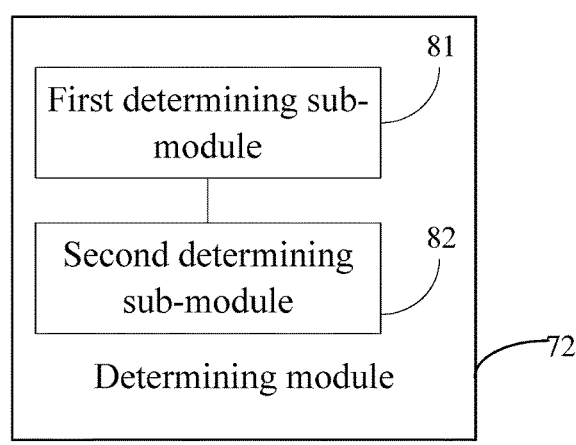
FIG. 8 is a block diagram of a determining module in an apparatus of photography prompts according to an exemplary embodiment.

FIG. 8 is a block diagram of a determining module in an apparatus of photography prompts according to an exemplary embodiment.

As shown in FIG. 8, in an embodiment, when the target state characteristic includes an age of the target subject, the determining module 72 includes a first determining sub-module 81 and a second determining sub-module 82.

The first determining sub-module 81 is configured to determine a target age range to which the age of the target subject belongs.

A plurality of age ranges may be preset, for example, an age range from 1 year old to 6 years old is set as children, an age range from 7 years old to 17 years old is set as teenagers, an age range from 18 years old to 50 years old is set as adults, and an age range of over 50 years old is set as the elderly. Thus, regarding different target subjects, the target age range to which the age of the target subject belongs is determined first. For example, if the person A is obtained as the target subject in the current viewfinder interface, an age of the person A is further obtained, which may be realized in many ways. For example, facial recognition and analysis concerning the person A may be conducted, and the age of the person A is found out according to a facial feature (like skin conditions) of the user. Certainly, a prompt message may be output to prompt the user to input his own age, and the age of the user may be obtained from other applications—for example, the age of the person may be obtained from a contact list of the terminal if the contact list is stored with head portraits and profiles of users.

Supposing that the person A obtained as the target subject in the current viewfinder interface is three years old, the target age range to which the person A belongs is the age range from 1 year old to 6 years old as children.

The second determining sub-module 82 is configured to determine a preset age range corresponding to the target age range and to determine the target voice prompt message corresponding to the preset age range based on a correspondence relationship between preset age ranges and preset voice prompt messages.

The terminal may pre-store respective voice prompt messages corresponding to respective age ranges. For example, for children of 1 to 6 years old, the preset voice prompt message may be nursery rhymes, sounds of parents, sounds of kitten and puppy and sounds of object collisions, so as to attract attention of children. For teenagers of 7 to 17 years old, the preset voice prompt message may be cartoon songs, audios dubbed for different characters in cartoons, and classic TV theme songs. For adults of 18 to 50 years old, the preset voice prompt message may be classic music appropriate for this age range. For the elderly of over 50 years old, the preset voice prompt message may be a prompt tone of a large volume, such that an elder user weak in listening may listen to the prompt tone clearly.

Certainly, one age range may be further subdivided. For example, the age range from 1 year old to 6 years old may be subdivided into an age range of 1 to 3 years old and an age range of 4 to 6 years old; for the children of 1 to 3 years old, the preset voice prompt message may be simple audios, while for the children of 4 to 6 years old, the preset voice prompt message may be lively songs which enable children to dance to the music to shoot videos.

In this embodiment, after the target age range to which the age of the target subject belongs is determined, the target voice prompt message may be determined based on the target age range and the correspondence relationship between preset age ranges and preset voice prompt messages. Thus, different prompting needs of different users can be satisfied through the targeted output of the target voice prompt message, instead of prompting all the users with the same prompt message.

Besides the age of the target subject, the target state characteristic may be other characteristics, for example completeness of the target subject in the current viewfinder interface.

Figure 9A:
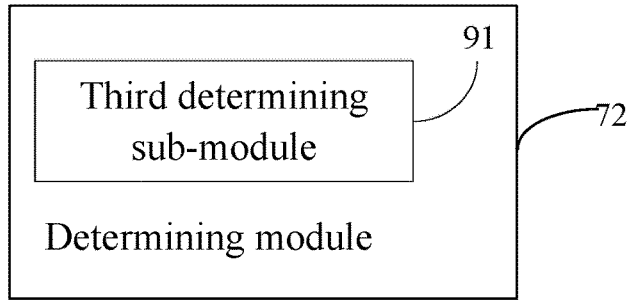
FIG. 9A is a block diagram of a determining module in another apparatus of photography prompts according to an exemplary embodiment.

FIG. 9A is a block diagram of a determining module in another apparatus of photography prompts according to an exemplary embodiment.

As shown in FIG. 9A, in an embodiment, when the target state characteristic includes completeness in the current viewfinder interface, the determining module 72 includes a third determining sub-module 91 configured to determine a first preset voice prompt message as the target voice prompt message, if the target subject is not completely in the current viewfinder interface.

If the target subject is not completely in the current viewfinder interface, for example, only half of the body of the user being in the current viewfinder interface, the first preset voice prompt message is determined as the target voice prompt message. The first preset voice prompt message may be a prompt message for prompting the user to adjust his position, like "please adjust your position and enter the viewfinder interface."

Figure 9B:
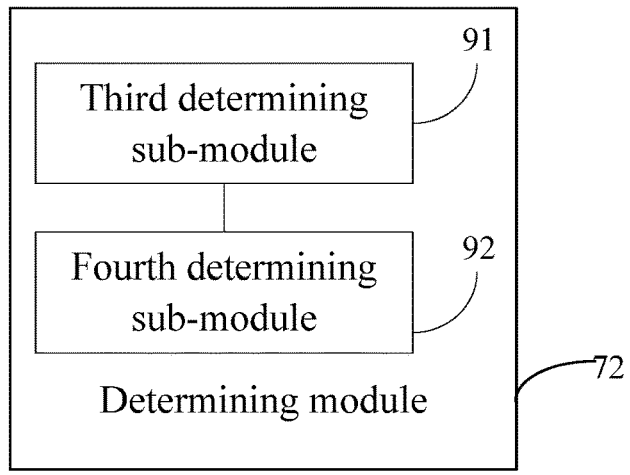
FIG. 9B is a block diagram of a determining module in another apparatus of photography prompts according to an exemplary embodiment.

FIG. 9B is a block diagram of a determining module in another apparatus of photography prompts according to an exemplary embodiment.

As shown in FIG. 9B, the determining module 72 further includes a fourth determining sub-module 92 configured to determine a second preset voice prompt message as the target voice prompt message, if the target subject is completely in the current viewfinder interface.

When the target subject is completely in the current viewfinder interface, for example, the whole body of the user being in the center of the current viewfinder interface, the second preset voice prompt message is determined as the target voice prompt message. The second preset voice prompt message may be a prompt message, like "the current position is very good and please shoot."

Thus, if the user does not fully enter the current viewfinder interface, the user may be prompted to avoid a defect of incomplete portraits in a photo taken by the user, thereby ensuring the quality of the photo taken by the user and improving user experience.

Figure 10:
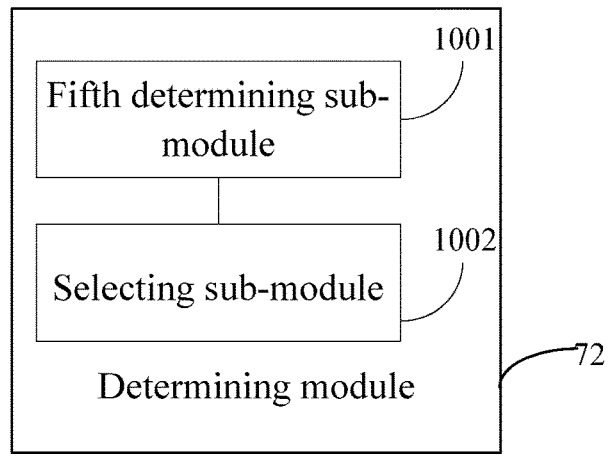
FIG. 10 is a block diagram of a determining module in another apparatus of photography prompts according to an exemplary embodiment.

FIG. 10 is a block diagram of a determining module in another apparatus of photography prompts according to an exemplary embodiment.

As shown in FIG. 10, in an embodiment, the determining module 72 further includes a fifth determining sub-module 1001 and a selecting sub-module 1002.

The fifth determining sub-module 1001 is configured to determine the preset age range to which the age of each target subject belongs if there are a plurality of target subjects.

When there are a plurality of target subjects, for example, shooting many people at the same time, the preset age range to which the age of each target subject belongs may be determined. For example, the target subjects include persons A, B and C; the person A is 30 years old, whose target age range is the age range of 18 to 50 years old as adults, the person B is 3 years old, whose target age range is the age range of 1 to 6 years old as children, and the person C is 35 years old, whose target age range is the age range of 18 to 50 years old as adults. In such a case, a plurality of target age ranges are presented, and it is possible to select a final target age range according to a predetermined rule.

The selecting sub-module 1002 is configured to select one of at least one preset age ranges as the target age range according to a predetermined rule. The predetermined rule may include counting the number of times of each preset age range to which each target subject belongs and selecting the preset age range with the maximum number of times as the target age range.

In the above example where the target subjects include persons A, B and C, it is obtained that the person A is 30 years old, whose target age range is the age range of 18 to 50 years old as adults, the person B is 3 years old, whose target age range is the age range of 1 to 6 years old as children, and the person C is 35 years old, whose target age range is the age range of 18 to 50 years old as adults, so the age range of 18 to 50 years old as adults appears twice while the age range of 1 to 6 years old as children appears once. In such a case, the age range of 18 to 50 years old as adults is determined as the target age range, and the voice prompt message corresponding to the age range of 18 to 50 years old is determined as the target voice prompt message. This approach will meet the prompting needs of most of the target persons, and improve user experience of most photographed subjects.

Alternatively, the predetermined rule may include: selecting the preset age range of highest priority as the target age range from the preset age ranges of respective target subjects based on priorities of the preset age ranges.

In this embodiment, the user or manufacturer may preset the priority of age ranges, for example, setting a descending order of priority: children, the elderly, teenagers and adults. In a case of a plurality of target subjects, the preset age range with the highest priority is selected as the target age range.

In the same example where the target subjects include persons A, B and C, it is obtained that the person A is 30 years old, whose target age range is the age range of 18 to 50 years old as adults, the person B is 3 years old, whose target age range is the age range of 1 to 6 years old as children, and the person C is 35 years old, whose target age range is the age range of 18 to 50 years old as adults, so the age range of 1 to 6 years old as children is determined as the target age range according to the order of priority, and the voice prompt message corresponding to the age range of 1 to 6 years old is determined as the target voice prompt message.

Figure 11A:
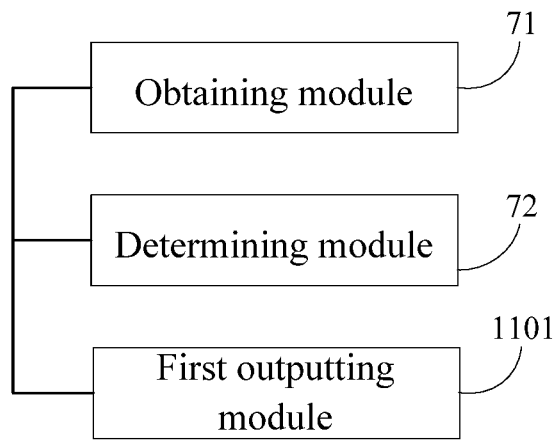
FIG. 11A is a block diagram of another apparatus of photography prompts according to an exemplary embodiment.

FIG. 11A is a block diagram of another apparatus of photography prompts according to an exemplary embodiment.

As shown in FIG. 11A, in an embodiment, the apparatus further includes: a first outputting module 1101 configured to output the target voice prompt message.

The target voice prompt message may be output after being determined, for example, through voice broadcast, such that the user acquires the prompt message.

Figure 11B:
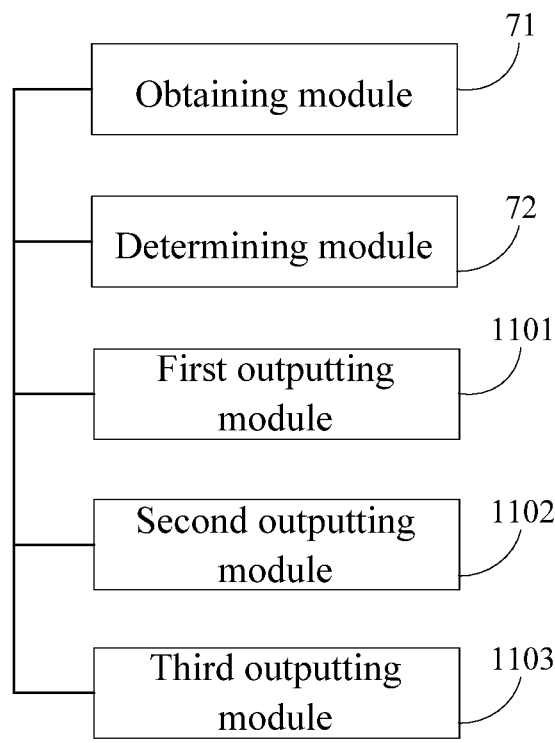
FIG. 11B is a block diagram of another apparatus of photography prompts according to an exemplary embodiment.

FIG. 11B is a block diagram of another apparatus of photography prompts according to an exemplary embodiment.

As shown in FIG. 11B, the apparatus further includes a second outputting module 1102 and a third outputting module 1103.

The second outputting module 1102 is configured to output a shooting start command at the start of outputting the target voice prompt message.

In this embodiment, the shooting start command may be output at the start of outputting the target voice prompt message, so as to control the terminal to start shooting. For example, the terminal starts automatic snapshot, continuous capture or video recording at the start of outputting the target voice prompt message.

The third outputting module 1103 is configured to output a shooting stop command at the end of outputting the target voice prompt message.

The terminal starts automatic snapshot, continuous capture or video recording at the start of outputting the target voice prompt message. However, the shooting stop command may be output at the end of outputting the target voice prompt message, so as to stop automatic snapshot, continuous capture or video recording.

Figure 12:
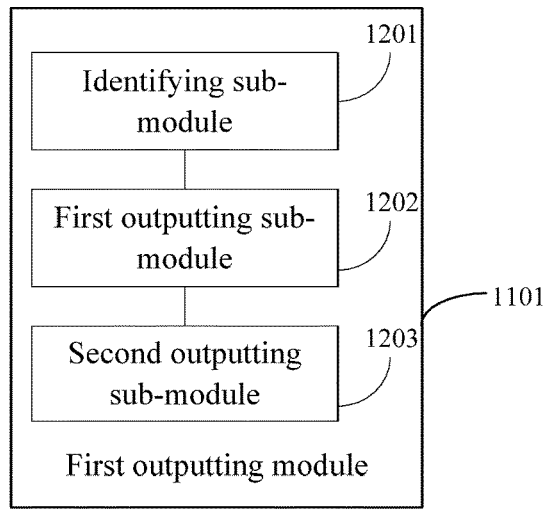
FIG. 12 is a block diagram of a first outputting module in another apparatus of photography prompts according to an exemplary embodiment.

FIG. 12 is a block diagram of a first outputting module in another apparatus of photography prompts according to an exemplary embodiment.

As shown in FIG. 12, in an embodiment, the first outputting module 1101 includes: an identifying sub-module 1201 configured to identify gender of the target subject; a first outputting sub-module 1202 configured to output the target voice prompt message in a first output mode if the target subject is male; and a second outputting sub-module 1203 configured to output the target voice prompt message in a second output mode if the target subject is female.

In this embodiment, the target voice prompt message may be output in different modes according to the gender of the target subject. For example, when the target subject is male, the target voice prompt message may be output in a gentle female voice; when the target subject is female, the target voice prompt message may be output in a magnetic male voice, so as to further improve the user experience.

According to a third aspect of embodiments of the present disclosure, there is provided a device of photography prompts. The device includes: a processor, and a memory configured to store an instruction executable by the processor. The processor is configured to: obtain a target state characteristic of a target subject in a current viewfinder interface of a terminal, and determine a target voice prompt message corresponding to the target state characteristic.

When the target state characteristic includes an age of the target subject, the processor may be further configured to determine the target voice prompt message corresponding to the target state characteristic by acts of determining a target age range to which the age of the target subject belongs; determining a preset age range corresponding to the target age range; and determine the target voice prompt message corresponding to the preset age range based on a correspondence relationship between preset age ranges and preset voice prompt messages.

When the target state characteristic includes completeness in the current viewfinder interface, the processor may be further configured to determine the target voice prompt message corresponding to the target state characteristic by acts of determining a first preset voice prompt message as the target voice prompt message if the target subject is not completely in the current viewfinder interface, and determining a second preset voice prompt message as the target voice prompt message if the target subject is completely in the current viewfinder interface.

The processor may be further configured to determine the target voice prompt message corresponding to the target state characteristic by acts of determining the preset age range to which the age of each target subject belongs if there are a plurality of target subjects, and selecting one of at least one preset age ranges as the target age range according to a predetermined rule. The predetermined rule includes: counting the number of times of each preset age range to which each target subject belongs and selecting the preset age range with the maximum number of times as the target age range; or selecting the preset age range of highest priority as the target age range from the preset age ranges of respective target subjects based on priorities of the preset age ranges.

The processor may be further configured to output the target voice prompt message; output a shooting start command at the start of outputting the target voice prompt message; and output a shooting stop command at the end of outputting the target voice prompt message.

The processor may be further configured to output the target voice prompt message by acts of identifying gender of the target subject; outputting the target voice prompt message in a first output mode if the target subject is male; and outputting the target voice prompt message in a second output mode if the target subject is female.

Figure 13:
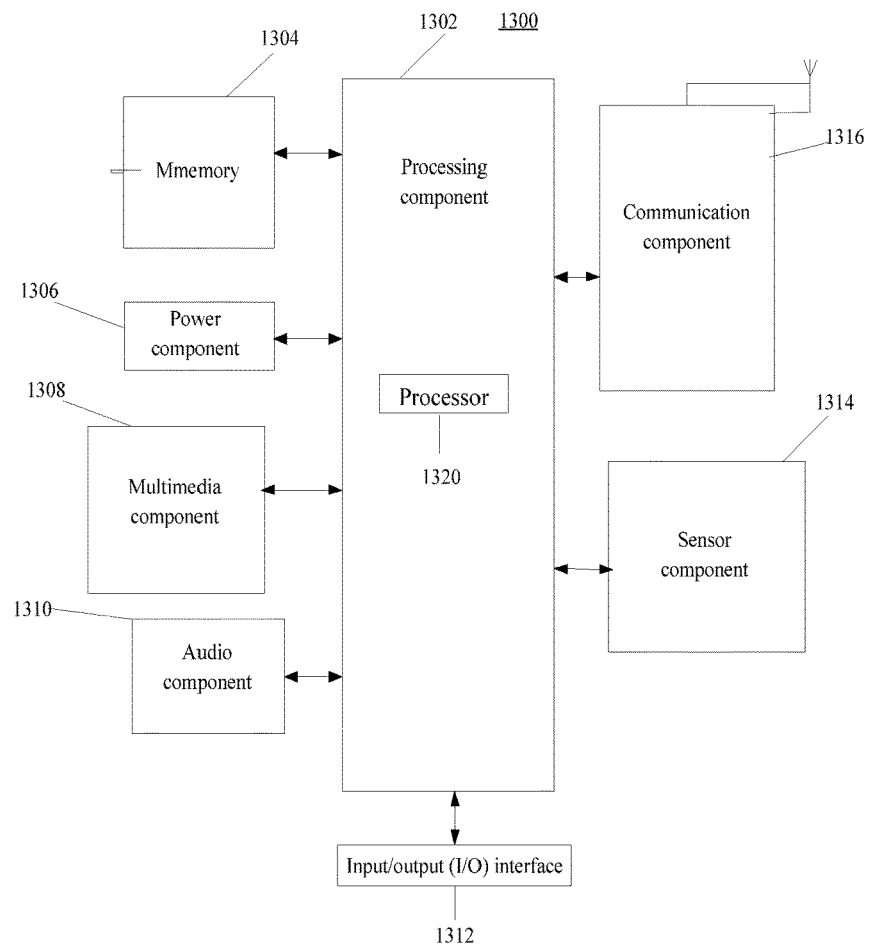
FIG. 13 is a block diagram of a device of photography prompts according to an exemplary embodiment.

FIG. 13 is a block diagram of a device of photography prompts according to an exemplary embodiment, and the device is suitable for a terminal. For example, the device 1300 may be a mobile phone, a computer, a digital broadcast terminal, a messaging device, a gaming console, a tablet, a medical device, exercise equipment, a personal digital assistant, and the like.

The device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1308 includes a front camera and/or a rear camera. The front camera and the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keypad, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate communication, wired or wirelessly, between the device 1300 and other devices. The device 1300 can access a wireless network based on a communication standard, such as WiFi, 2G, or 3G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FP- GAs), controllers, micro-controllers, microprocessors, or other electronic components, for performing the above described methods.

In exemplary embodiments, there is also provided a non-transitory computer-readable storage medium including instructions, such as included in the memory 1304, executable by the processor 1320 in the device 1300, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium has stored therein instructions that, when executed by a processor of the device 1300, causes the device 1300 to perform a method of photography prompts.

The method includes: obtaining a target state characteristic of a target subject in a current viewfinder interface of a terminal; and determining a target voice prompt message corresponding to the target state characteristic.

In an embodiment, the target state characteristic includes an age of the target subject; determining the target voice prompt message corresponding to the target state characteristic includes: determining a target age range to which the age of the target subject belongs; determining a preset age range corresponding to the target age range; and determining a the target voice prompt message corresponding to the preset age range based on a correspondence relationship between preset age ranges and preset voice prompt messages.

In an embodiment, the target state characteristic includes completeness in the current viewfinder interface; determining the target voice prompt message corresponding to the target state characteristic includes: determining a first preset voice prompt message as the target voice prompt message, if the target subject in the current viewfinder interface is not complete; and determining a second preset voice prompt message as the target voice prompt message, if the target subject in the current viewfinder interface is complete.

In an embodiment, determining the target voice prompt message corresponding to the target state characteristic further includes: determining the preset age range to which the age of each target subject belongs, if there are a plurality of target subjects; selecting one of at least one preset age ranges as the target age range according to a predetermined rule that includes: counting the number of times of each preset age range to which each target subject belongs and selecting the preset age range with the maximum number of times as the target age range; or selecting the preset age range of highest priority as the target age range from the preset age ranges of respective target subjects based on priorities of the preset age ranges.

In an embodiment, the method further includes: outputting the target voice prompt message; outputting a shooting start command at the start of outputting the target voice prompt message; and outputting a shooting stop command at the end of outputting the target voice prompt message.

In an embodiment, outputting the target voice prompt message includes: identifying gender of the target subject; outputting the target voice prompt message in a first output mode if the target subject is male; and outputting the target voice prompt message in a second output mode if the target subject is female.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method of photography prompts, the method comprising:
   obtaining a target state characteristic of a target subject in a current viewfinder interface of a terminal, wherein the target state characteristic comprises an age of the target subject;
   determining a target voice prompt message corresponding to the target state characteristic,
      wherein determining the target voice prompt message corresponding to the target state characteristic comprises: determining a target age range to which the age of the target subject belongs; determining a preset age range corresponding to the target age range; and determining the target voice prompt message corresponding to the preset age range based on a correspondence relationship between preset age ranges and preset voice prompt messages; and
      wherein determining the target voice prompt message corresponding to the target state characteristic further comprises: determining the preset age range to which the age of each target subject belongs if there are a plurality of target subjects; selecting one of at least one preset age ranges as the target age range according to a predetermined rule that comprises: counting the number of times of each preset age range to which each target subject belongs and selecting the preset age range with the maximum number of times as the target age range; or selecting the preset age range of highest priority as the target age range from the preset age ranges of respective target subjects based on priorities of the preset age ranges; and
   outputting the target voice prompt message.

2. The method according to claim 1, wherein the target state characteristic further comprises completeness in the current viewfinder interface;
   determining the target voice prompt message corresponding to the target state characteristic comprises:
   determining a first preset voice prompt message as the target voice prompt message if the target subject in the current viewfinder interface is not complete.

3. The method according to claim 1, wherein the target state characteristic further comprises completeness in the current viewfinder interface;
   determining the target voice prompt message corresponding to the target state characteristic comprises:
   determining a second preset voice prompt message as the target voice prompt message if the target subject in the current viewfinder interface is complete.

4. The method according to claim 1, further comprising:
   outputting a shooting start command at the start of outputting the target voice prompt message; and
   outputting a shooting stop command at the end of outputting the target voice prompt message.

5. The method according to 1, wherein outputting the target voice prompt message comprises:
identifying gender of the target subject;
outputting the target voice prompt message in a first output mode if the target subject is male; and
outputting the target voice prompt message in a second output mode if the target subject is female.

6. A device of photography prompts, the device comprising:
a processor;
a memory configured to store an instruction executable by the processor;
wherein the processor is configured to:
obtain a target state characteristic of a target subject in a current viewfinder interface of a terminal, wherein the target state characteristic comprises an age of the target subject;
determine a target voice prompt message corresponding to the target state characteristic,
wherein the processor is further configured to determine the target voice prompt message corresponding to the target state characteristic by acts of: determining a target age range to which the age of the target subject belongs; determining a preset age range corresponding to the target age range; and determining the target voice prompt message corresponding to the preset age range based on a correspondence relationship between preset age ranges and preset voice prompt messages; and
wherein the processor is further configured to determine the target voice prompt message corresponding to the target state characteristic by acts of: determining the preset age range to which the age of each target subject belongs if there are a plurality of target subjects; selecting one of at least one preset age ranges as the target age range according to a predetermined rule that comprises: counting the number of times of each preset age range to which each target subject belongs and selecting the preset age range with the maximum number of times as the target age range; or selecting the preset age range of highest priority as the target age range from the preset age ranges of respective target subjects based on priorities of the preset age ranges; and
output the target voice prompt message.

7. The device according to claim 6, wherein the target state characteristic further comprises completeness in the current viewfinder interface;
the processor is further configured to determine the target voice prompt message corresponding to the target state characteristic by an act of:
determining a first preset voice prompt message as the target voice prompt message if the target subject in the current viewfinder interface is not complete.

8. The device according to claim 6, wherein the target state characteristic further comprises completeness in the current viewfinder interface;
the processor is further configured to determine the target voice prompt message corresponding to the target state characteristic by an act of:
determining a second preset voice prompt message as the target voice prompt message if the target subject in the current viewfinder interface is complete.

9. The device according to claim 6, wherein the processor is further configured to:
output a shooting start command at the start of outputting the target voice prompt message; and
output a shooting stop command at the end of outputting the target voice prompt message.

10. The device according to claim 6, wherein the processor is configured to output the target voice prompt message by acts of:
identifying gender of the target subject;
outputting the target voice prompt message in a first output mode if the target subject is male; and
outputting the target voice prompt message in a second output mode if the target subject is female.

11. A non-transitory computer-readable storage medium having stored therein instructions that, when executed by a processor of a device, causes the device to perform a method of photography prompts, the method comprising:
obtaining a target state characteristic of a target subject in a current viewfinder interface of a terminal, wherein the target state characteristic comprises an age of the target subject;
determining a target voice prompt message corresponding to the target state characteristic,
wherein determining the target voice prompt message corresponding to the target state characteristic comprises: determining a target age range to which the age of the target subject belongs; determining a preset age range corresponding to the target age range; and determining the target voice prompt message corresponding to the preset age range based on a correspondence relationship between preset age ranges and preset voice prompt messages; and
wherein determining the target voice prompt message corresponding to the target state characteristic further comprises: determining the preset age range to which the age of each target subject belongs if there are a plurality of target subjects; selecting one of at least one preset age ranges as the target age range according to a predetermined rule that comprises: counting the number of times of each preset age range to which each target subject belongs and selecting the preset age range with the maximum number of times as the target age range; or selecting the preset age range of highest priority as the target age range from the preset age ranges of respective target subjects based on priorities of the preset age ranges; and
outputting the target voice prompt message.

12. The non-transitory computer-readable storage medium according to claim 11, wherein the target state characteristic further comprises completeness in the current viewfinder interface;
determining the target voice prompt message corresponding to the target state characteristic comprises:
determining a first preset voice prompt message as the target voice prompt message if the target subject in the current viewfinder interface is not complete.

* * * * *